UNITED STATES PATENT OFFICE.

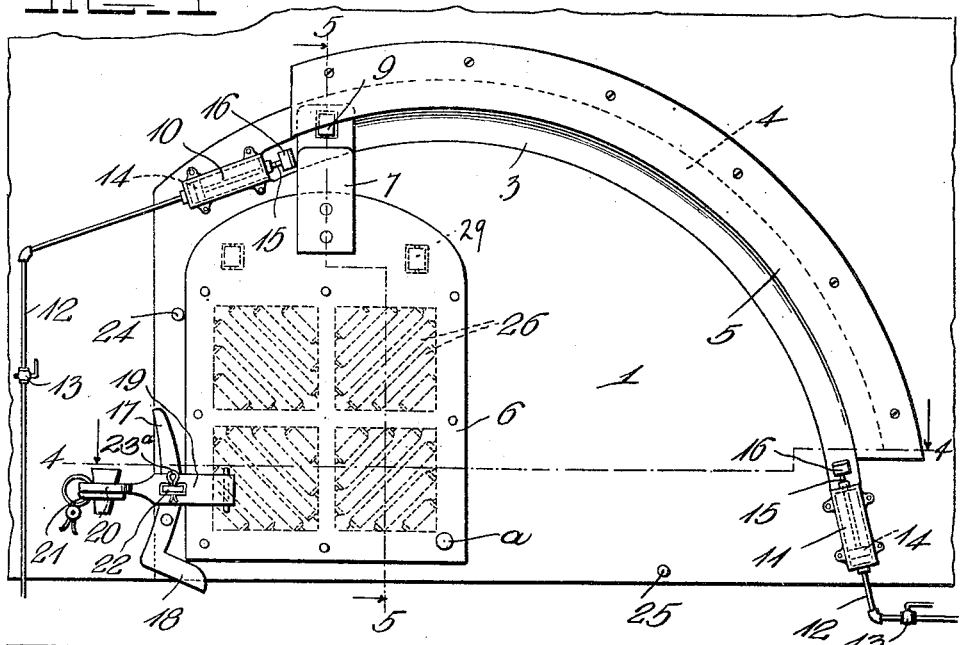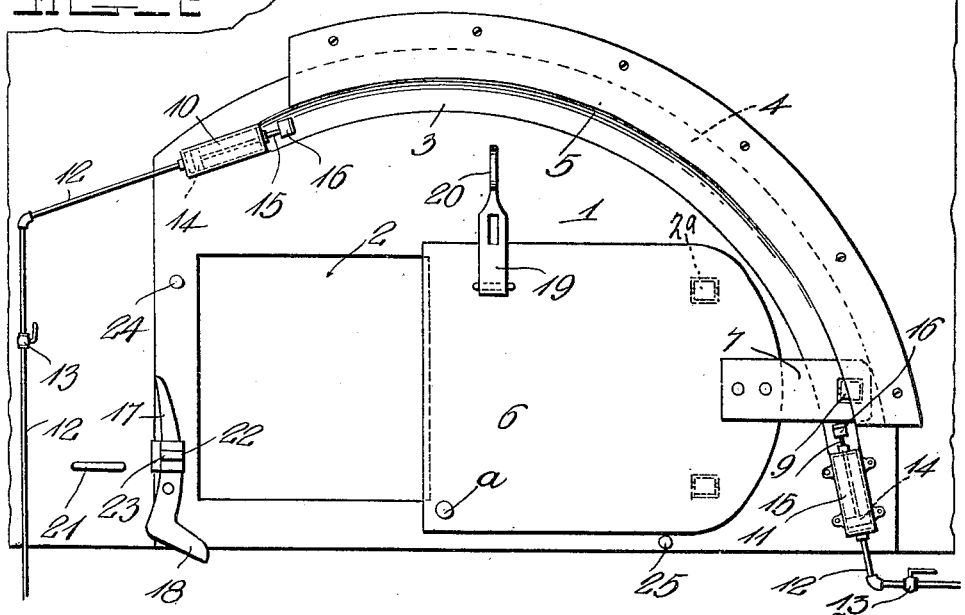

JOSEPH TONEY, OF SALT LAKE CITY, UTAH, ASSIGNOR OF ONE-HALF TO MAGGIE BENNETT AND ADELIA MURIE, BOTH OF SALT LAKE CITY, UTAH.

FREIGHT-CAR DOOR.

1,131,807.  Specification of Letters Patent.  Patented Mar. 16, 1915.

Application filed December 5, 1912. Serial No. 735,155.

*To all whom it may concern:*

Be it known that I, JOSEPH TONEY, a citizen of the United States, residing at Salt Lake City, in the county of Salt Lake and State of Utah, have invented certain new and useful Improvements in Freight-Car Doors; and I do declare the following to be a full, clear, and exact description of the invention, such as will enable others skilled in the art to which it appertains to make and use the same.

This invention relates to improvements in car doors and means for operating the same.

One object of the invention is to provide an improved construction of car door and means whereby the same may be opened and closed either by air pressure or by hand power.

Another object is to provide a car door having means whereby the frictional engagement thereof with objects in the car which have been placed against the door, will be reduced to a minimum.

With the foregoing and other objects in view the invention consists of certain novel features of construction, combination and arrangement of parts as will be more fully described and particularly pointed out in the appended claim.

In the accompanying drawings: Figure 1 is a side view of the outer side of a portion of a car showing my improved door applied thereto and in closed position; Fig. 2 is a similar view showing the door in open position.

Referring more particularly to the drawings 1 denotes the side of a freight car in which is formed the usual door opening 2. In the side of the car above the door and extending to one side of the same is formed a curved guide groove 3 above which is arranged to guide track 4 and overhanging guide flange 5 which is secured to the side of the car and spaced a suitable distance from said track in any suitable manner.

Pivotally connected by a pivot pin *a* at its lower inner corner to the side of the car near the adjacent lower corner of the door opening is a door 6 which is adapted to be swung on its pivotal connection to open and close the door opening 2 in the side of the car. To the top of the door at the center thereof is secured an upwardly projecting guide arm 7 having on its inner side an inwardly projecting guide lug 8 which is adapted to engage and travel in the guide groove 3 when the door is opened and closed. In the arm 7 is also revolubly mounted an anti-friction roller 9 which is adapted to engage and travel on the track 4 beneath the guard flange 5. By means of the arm 7 and guide lug 8 which engages the guide groove 3 the door will be guided in its pivotal opening and closing movements. The engagement of the upper end of the arm 7 and the roller 9 therein between the guide track 4 and the flange 5 will hold the upper portion of the door in proper engagement with the side of the car while being opened and closed and when in an open or closed position. The force or pressure applied to the door by the plunger rods 15 is sufficient to throw or swing the door far enough to bring the center of gravity thereof past its pivotal connection so that the door will open or close the remaining distance by its own weight as will be readily understood. It will thus be obvious that if sufficient air pressure be brought to bear against the door pivoted as above described, said door may be rocked or tilted on its pivotal connection, irrespective of its weight. In other words, the operation of the door in the manner described, simply depends upon sufficient air pressure being admitted to the cylinders for opening and closing the door.

In order that the door may be readily opened by hand power when the pneumatic operating mechanism for any reason cannot be used I provide a door opening lever 17 having a right angularly projecting door engaging arm 18 formed on its lower end, said lever being pivotally mounted on the side of the car adjacent to the lower free corner of the door. When the lever 17 is thus pivotally connected to the car the arm 18 will project beneath the lower edge of the free corner of the door so that when the upper end of said lever is swung laterally said arm will be brought into forcible engagement with the lower end of the door thereby pushing or swinging the same around on its pivotal connection to a sufficient distance to bring the center of gravity of the door beyond its pivotal connection whereupon the weight of the door will cause the same to continue to open by gravity until the arm 7 comes into engagement with the plunger rod of the cylinder 11 as clearly shown in Fig. 2 of the drawing. It will be understood that the force of the engagement of the lever 17 with the door is sufficient to throw or swing the upper portion of the door past its pivotal connection as described.

In order to fasten the door in closed position I provide a hasp 19 which is secured to the free edge of the door adjacent to its lower end and has formed in its outer end an eye 20. When the door is in closed position the eye in the outer end of the hasp will engage or register with a keeper or stationary member 21 of the fastening which is secured to the side of the car. When the eye in the hasp and keeper are thus brought into alinement a fastening pin, lock or seal may be engaged with said eyes and the door thus fastened in closed position. The hasp 19 is preferably provided with a slot 22 adapted to engage an apertured lug 23 on the door opening lever 17. With the aperture in the lug 23 is engaged a cotter pin or other suitable fastening 23ª. In the side of the car are arranged stop pins 24 and 25 which are adapted to be engaged by the door when the latter is brought to the limit of its closing and opening movements.

In order to prevent the frictional engagement of the inner side of the door with any objects in the car which may have been placed or piled against the door I preferably provide the door with a series of revolubly mounted rollers 26. The rollers 26 are preferably arranged in sets and are mounted in recesses 27 formed in the inner side of the door. The rollers in each set are disposed in oblique or inclined positions so that the same will more readily engage and travel over any objects which may have been piled against the inner side of the door thus preventing the binding of the latter and permitting the same to be readily opened or closed by the operating mechanism herein described. Revolubly mounted in recesses 28 formed in the inner side of the door near the upper end thereof are anti-friction rollers 29 which are adapted to engage the outer side of the car as the door is swung to open and closed positions thus preventing the door from coming into frictional contact with the side of the car.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

In a door opening mechanism the combination with a door having a pivotal connection with a horizontal pivot contiguous to the lower corner of the door; of a bell crank lever pivotally mounted adjacent the free lower corner of the door, one arm of said lever being adapted to engage the lower edge of the door whereby when the lever is operated, said arm will swing the door to an open position until its center of gravity has passed its pivotal connection with the side of the car whereby the door will continue to open by gravity, and a hinged hasp secured to the door approximately opposite the pivotal connection thereof and adapted to be interlocked with the bell crank lever when the door is in a closed position whereby said lever and door are locked against movement.

In testimony whereof I have hereunto set my sand in presence of two subscribing witnesses.

JOSEPH TONEY.

Witnesses:
 CORA M. HOLDERMAN,
 EDWIN W. SENIOR.

Copies of this patent may be obtained for five cents each, by addressing the "Commissioner of Patents, Washington, D. C."